(12) United States Patent
Ji

(10) Patent No.: US 12,191,792 B2
(45) Date of Patent: Jan. 7, 2025

(54) CIRCUIT FOR AN INVERTER

(71) Applicant: Protean Electric Limited, Farnham (GB)

(72) Inventor: Chao Ji, Farnham (GB)

(73) Assignee: PROTEAN ELECTRIC LIMITED, Farnham (GB)

( * ) Notice: Subject to any disclaimer, the term of this patent is extended or adjusted under 35 U.S.C. 154(b) by 116 days.

(21) Appl. No.: 17/905,983

(22) PCT Filed: Mar. 10, 2021

(86) PCT No.: PCT/IB2021/051986
§ 371 (c)(1),
(2) Date: Sep. 9, 2022

(87) PCT Pub. No.: WO2021/181297
PCT Pub. Date: Sep. 16, 2021

(65) Prior Publication Data
US 2023/0094560 A1    Mar. 30, 2023

(30) Foreign Application Priority Data

Mar. 11, 2020 (GB) ..................... 2003552

(51) Int. Cl.
*H02P 29/024* (2016.01)
*H02M 7/5387* (2007.01)
(Continued)

(52) U.S. Cl.
CPC .......... *H02P 29/0241* (2016.02); *H02P 27/08* (2013.01); *H02P 29/028* (2013.01); *H02M 7/5387* (2013.01)

(58) Field of Classification Search
CPC combination set(s) only.
See application file for complete search history.

(56) References Cited

U.S. PATENT DOCUMENTS 9,438,144 B2 *  9/2016 Xu .............................. H02P 6/12
2008/0304189 A1 * 12/2008 Tang .................... H02H 7/1222
318/434

(Continued)

FOREIGN PATENT DOCUMENTS

JP        62286112  A  * 12/1987
KR     2010042744  A  *  4/2010

*Primary Examiner* — Bickey Dhakal
(74) *Attorney, Agent, or Firm* — ALLEN, DYER ET AL.

(57) ABSTRACT

A circuit for a multi phase bridge inverter having a plurality of high and low side switches arranged to be coupled, respectively, to first and second power source busbars. The multi phase inverter is arranged to control current flow in coil windings of an electric motor, and a DC link capacitor is coupled between the first and second power source busbars. The circuit comprises first and second impedances coupled in series between the first and second power source busbars and in parallel to the DC link capacitor, and means coupled between the first and second impedances for providing a voltage from the coupling between the first and second impedances to the low side switches upon the occurrence of a first predetermined condition to place the low side switches in a close circuit configuration to allow coil windings of an electric motor to be placed in a short circuit configuration.

19 Claims, 9 Drawing Sheets

(51) Int. Cl.
*H02P 27/08* (2006.01)
*H02P 29/028* (2016.01)

(56) References Cited

U.S. PATENT DOCUMENTS

2009/0195199 A1* 8/2009 Ito .......................... B60L 3/003
  180/65.285
2011/0310644 A1* 12/2011 Ogura .................... H02M 1/32
  363/55

* cited by examiner ated to a coil winding 16 of a three phase electric motor.

CIRCUIT FOR AN INVERTER

CROSS-REFERENCE TO RELATED APPLICATIONS

This application is the § 371 National Stage Entry of International Application No. PCT/IB2021/051986, filed on Mar. 10, 2021, which claims the benefit of GB Application No. 2003552.3, filed on Mar. 11, 2020, the contents of which applications are herein incorporated by reference in their entirety.

FIELD OF THE INVENTION

The present invention relates to a circuit, in particular a circuit for an inverter for controlling current flow in coil windings of an electric motor.

BACKGROUND OF THE INVENTION

Electric motors work on the principle that a current carrying wire will experience a force when in the presence of a magnetic field. When the current carrying wire is placed perpendicular to the magnetic field the force on the current carrying wire is proportional to the flux density of the magnetic field. Typically, in an electric motor the force on a current carrying wire is formed as a rotational torque.

Examples of known types of electric motor include the induction motor, brushless permanent magnet motor, switched reflectance motor, and a synchronous slip ring motor, which have a rotor and a stator, as is well known to a person skilled in the art.

The rotor for permanent magnet motor typically includes a plurality of permanent magnets, where the plurality of permanent magnets is mounted on or in a rotor back-iron such that the magnetic field alternates in polarity around the circumference of the rotor. As the rotor rotates relative to the stator the plurality of permanent magnets are arranged to sweep across the ends of coil windings mounted on the stator. Appropriate switching of currents in the coil windings allows synchronized attraction and repulsion of the poles of the permanent magnets to produce rotation or the rotor.

However, as the rotor rotates relative to the coil windings a back electromotive force, otherwise known as a back EMF, is generated that opposes the original applied voltage and consequently acts against the current flow that causes the rotor to rotate, thereby limiting the maximum rotation velocity of the rotor. To increase the maximum rotation velocity of a permanent magnet motor field weakening is utilized. However, the field weakening can result in an increase in the back EMF generated by the rotor rotating relative to the coil windings to a level greater than the DC bus level used for generating current flow in the coil windings.

If a fault occurs in the electric motor system, for example a fault in the electric motor and/or electric motor power source that causes the power source, such as a battery, to be disconnected, to avoid high back EMF voltages appearing on the positive power busbar rail the electric motor may be placed in a short-circuit operation mode, otherwise referred to as active short circuit mode, whereby all the coil windings are connected to the negative power busbar rail using the switches within the inverter, or in the alternative all the coil windings are connected to the positive power busbar rail. As a consequence, the back EMF will be applied across the coil windings, thereby protecting the inverter and any other components that are connected to the power busbars, otherwise known as the high voltage bus, such as the DC link capacitor, from over voltage.

For purposes of illustration, FIG. 1 shows a known electric motor system having a battery 10 coupled to a first busbar 11 and a second busbar 12, which in turn are coupled to a DC link capacitor 13 and a three phase inverter having three high side inverter switches 14 and three low side inverter switches 15. As illustrated in FIG. 1, the high side inverter switches 14 are coupled to the first busbar 11 (i.e. the positive busbar), while the low side inverter switches 15 are coupled to the second busbar 12 (i.e. the negative busbar). Each high side and low side switch combination form a leg of the inverter, with each leg of the inverter being coupled to a coil winding 16 of a three phase electric motor.

Each of the respective low side inverter switches are coupled to a low voltage power rail (not shown), for example 12 volts or 24 volts, which is arranged to close the low side inverter switches upon identification of a fault within the electric motor system, thereby placing the inverter into an active short circuit mode.

However, if the power source/battery becomes disconnected and the low voltage power rail fails the inverter cannot be placed into an active short circuit mode, thereby exposing the inverter, the DC link capacitor and the battery to a potential over voltage situation resulting from the back EMF from the electric motor.

To address this problem, for critical drive systems a backup low voltage power rail is typically utilized. However, a backup low voltage power rail has two potential shortcomings, one, it can take some time to 'wake up' and, two, it will increase the overall cost of the drive system.

It is desirable to improve this situation.

SUMMARY OF THE INVENTION

In accordance with an aspect of the present invention there is provided a circuit according to the accompanying claims.

The present invention as claimed has the advantage of guaranteeing the operation of an active short circuit mode without the need for an additional low voltage source, where the circuit is compact, low cost and easy to integrate into an electric motor system.

The present invention will now be described, by way of example, with reference to the accompanying drawings, in which:

DETAILED DESCRIPTION OF PREFERRED EMBODIMENTS

The embodiment of the invention described is for a circuit for use with an electric motor system, where the circuit is used to control the configuration and operation of an inverter following the power source/battery for the electric motor system becoming disconnected from the electric motor system's high voltage busbar. The inverter is arranged to control current within coil windings of an electric motor. In particular, the embodiment of the invention is arranged to place the electric motor system into a short circuit configuration upon the power source/battery for the electric motor system becoming disconnected from the electric motor system's high voltage busbar.

For the purposes of the present embodiment the electric motor is for use in a wheel of a vehicle, however the electric motor may be located anywhere within the vehicle. The motor is of the type having a set of coils being part of the stator for attachment to a vehicle, radially surrounded by a rotor carrying a set of magnets for attachment to a wheel. For the avoidance of doubt, the various aspects of the invention are equally applicable to an electric generator having the same arrangement. As such, the definition of an electric motor is intended to include electric generator. In addition, some of the aspects of the invention are applicable to an arrangement having the rotor centrally mounted within radially surrounding coils. As would be appreciated by a person skilled in the art, the present invention is applicable for use with other types of electric motors.

Figure 2:
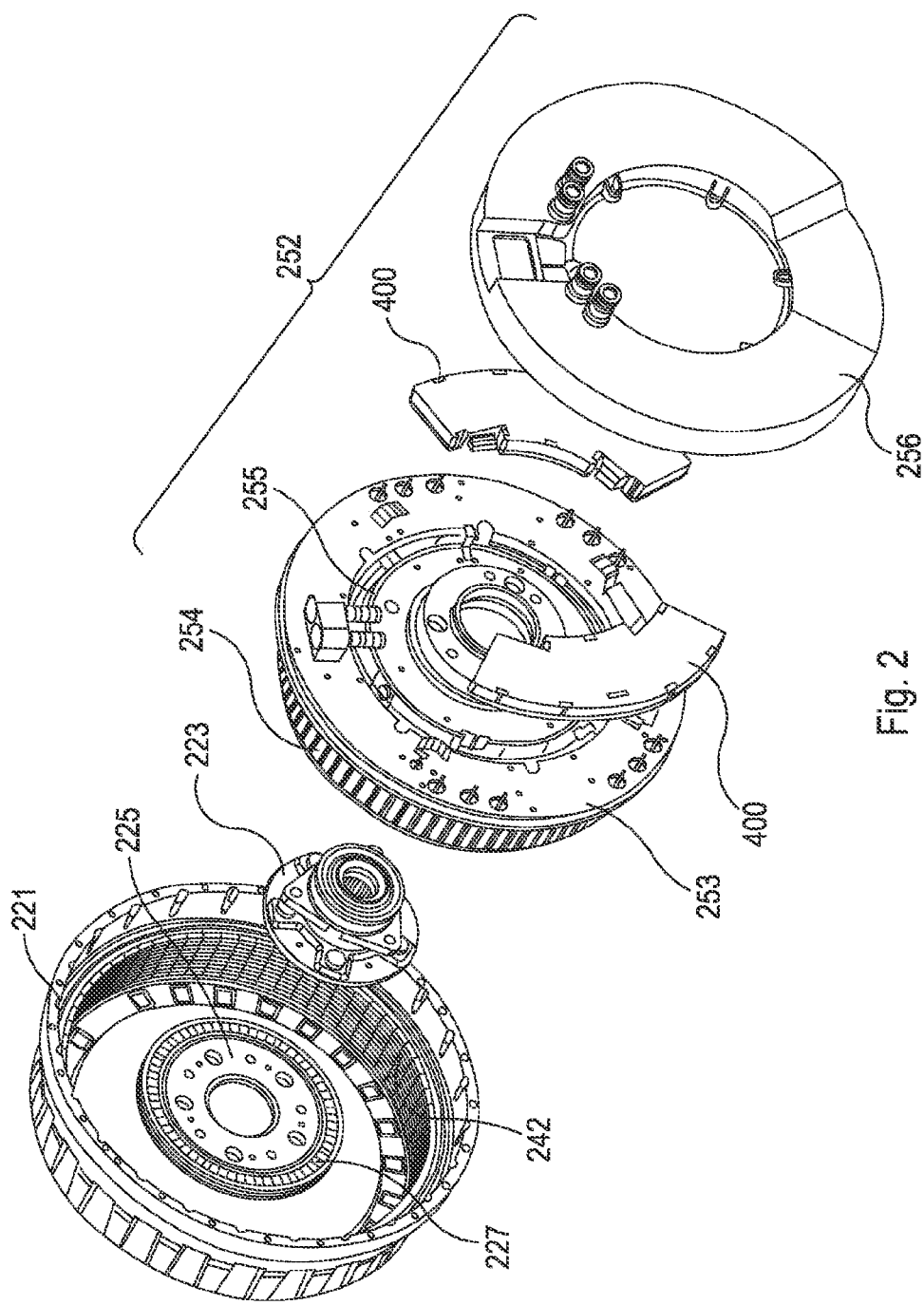
FIG. 2 illustrates an exploded view of a rotor according to an embodiment of the present invention.
Figure 3:
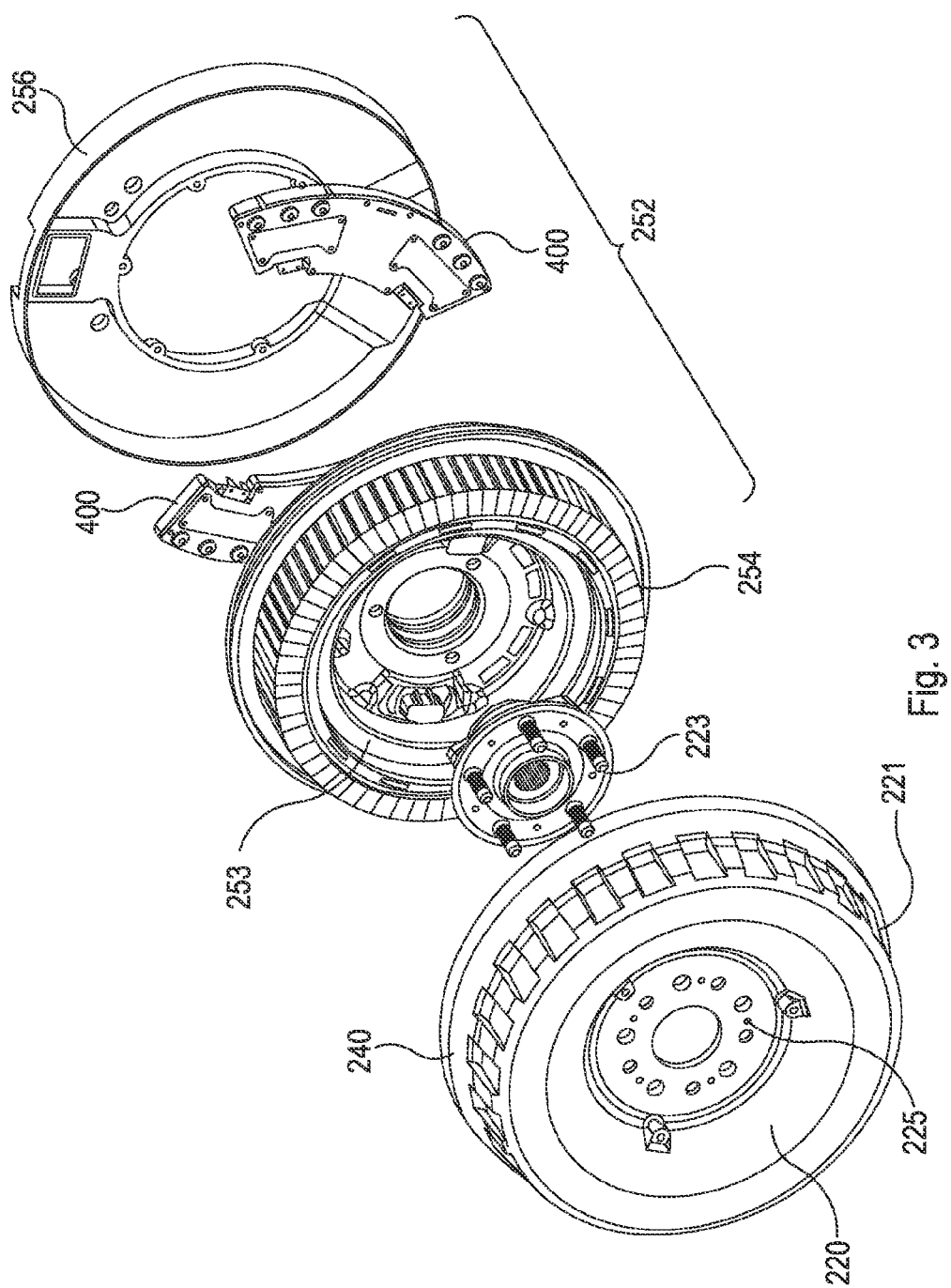
FIG. 3 illustrates a rotor according to an embodiment of the present invention.

For the purposes of the present embodiment, as illustrated in FIG. 2 and FIG. 3, the in-wheel electric motor includes a stator 252 comprising a heat sink 253, multiple coils 254, two control devices 400 mounted on the heat sink 253 on a rear portion of the stator for driving the coils, and an annular capacitor, otherwise known as a DC link capacitor, mounted on the stator within the inner radius of the control devices 400. The coils 254 are formed on stator tooth laminations to form coil windings. A stator cover 256 is mounted on the rear portion of the stator 252, enclosing the control devices 400 to form the stator 252, which may then be fixed to a vehicle and does not rotate relative to the vehicle during use.

Figure 4:
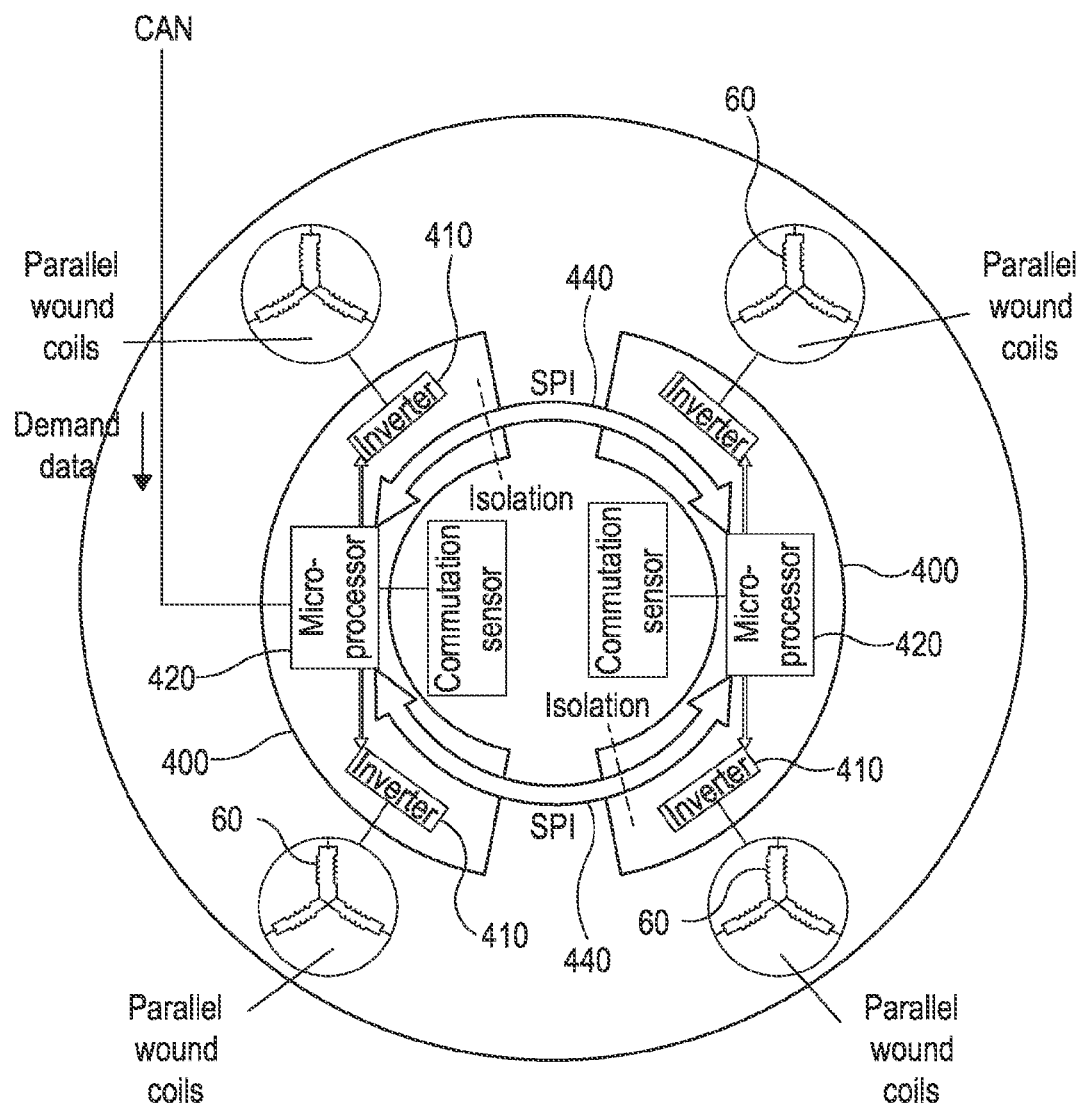
FIG. 4 illustrates a control device according to an embodiment of the present invention.

Each control device 400 includes two inverters 410 and control logic 420, which in the present embodiment includes a processor, for controlling the operation of the inverters 410, which is schematically represented in FIG. 4.

Although for purposes of the present embodiment the in-wheel electric motor includes two control devices, where each control device includes control logic, in other words a controller, for controlling the operation of an inverter, any configuration of control logic and inverter combination may be used, including placing the control logic and/or inverters remote to the electric motor.

The annular capacitor is coupled across the inverters 410 and the electric motor's DC power source for reducing voltage ripple on the electric motor's power supply line, otherwise known as the DC busbar, and for reducing voltage overshoots during operation of the electric motor. For reduced inductance the capacitor is mounted adjacent to the control devices 400.

A rotor 240 comprises a front portion 220 and a cylindrical portion 221 forming a cover, which substantially surrounds the stator 252. The rotor includes a plurality of permanent magnets 242 arranged around the inside of the cylindrical portion 221. For the purposes of the present embodiment 32 magnet pairs are mounted on the inside of the cylindrical portion 221. However, any number of magnet pairs may be used.

The magnets are in close proximity to the coil windings on the stator 252 so that magnetic fields generated by the coils interact with the magnets 242 arranged around the inside of the cylindrical portion 221 of the rotor 240 to cause the rotor 240 to rotate. As the permanent magnets 242 are utilized to generate a drive torque for driving the electric motor, the permanent magnets are typically called drive magnets.

The rotor 240 is attached to the stator 252 by a bearing block 223. The bearing block 223 can be a standard bearing block as would be used in a vehicle to which this motor assembly is to be fitted. The bearing block comprises two parts, a first part fixed to the stator and a second part fixed to the rotor. The bearing block is fixed to a central portion 253 of the wall of the stator 252 and also to a central portion 225 of the housing wall 220 of the rotor 240. The rotor 240 is thus rotationally fixed to the vehicle with which it is to be used via the bearing block 223 at the central portion 225 of the rotor 240. This has an advantage in that a wheel rim and tire can then be fixed to the rotor 240 at the central portion 225 using the normal wheel bolts to fix the wheel rim to the central portion of the rotor and consequently firmly onto the rotatable side of the bearing block 223. The wheel bolts may be fitted through the central portion 225 of the rotor through into the bearing block itself. With both the rotor 240 and the wheel being mounted to the bearing block 223 there is a one to one correspondence between the angle of rotation of the rotor and wheel.

FIG. 3 shows an exploded view of the same motor assembly illustrated in FIG. 2 from the opposite side. The rotor 240 comprises the outer rotor wall 220 and circumferential wall 221 within which magnets 242 are circumferentially arranged. As previously described, the stator 252 is connected to the rotor 240 via the bearing block at the central portions of the rotor and stator walls.

The rotor also includes a set of magnets 227 for position sensing, otherwise known as commutation magnets, which in conjunction with sensors mounted on the stator allows for a rotor flux angle to be estimated. The rotor flux angle defines the positional relationship of the drive magnets to the coil windings. Alternatively, in place of a set of separate magnets the rotor may include a ring of magnetic material that has multiple poles that act as a set of separate magnets.

To allow the commutation magnets to be used to calculate a rotor flux angle, preferably each drive magnet has an associated commutation magnet, where the rotor flux angle is derived from the flux angle associated with the set of commutation magnets by calibrating the measured commutation magnet flux angle. To simplify the correlation between the commutation magnet flux angle and the rotor flux angle, preferably the set of commutation magnets has the same number of magnets or magnet pole pairs as the set of drive magnet pairs, where the commutation magnets and associated drive magnets are approximately radially aligned with each other. Accordingly, for the purposes of the present embodiment the set of commutation magnets has 32 magnet pairs, where each magnet pair is approximately radially aligned with a respective drive magnet pair.

A sensor, which in this embodiment is a Hall sensor, is mounted on the stator. The sensor is positioned so that as the rotor rotates each of the commutation magnets that form the commutation magnet ring respectively rotates past the sensor.

As the rotor rotates relative to the stator the commutation magnets correspondingly rotate past the sensor with the Hall sensor outputting an AC voltage signal, where the sensor outputs a complete voltage cycle of 360 electrical degrees for each magnet pair that passes the sensor.

For improved position detection, preferably the sensor includes an associated second sensor placed 90 electrical degrees displaced from the first sensor.

In the present embodiment the electric motor includes four coil sets with each coil set having three coil sub-sets that are coupled in a wye configuration to form a three phase sub-motor, resulting in the motor having four three phase sub-motors. The operation of the respective sub-motors is controlled via one of the two control devices 400, as described below. However, although the present embodiment describes an electric motor having four coil sets (i.e. four sub motors) the motor may equally have one or more coil sets with associated control devices. In a preferred embodiment the motor includes eight coil sets 60 with each coil set having three coil sub-sets that are coupled in a wye configuration to form a three phase sub-motor, resulting in the motor having eight three phase sub-motors. Similarly, each coil set may have any number of coil sub-sets, thereby allowing each sub-motor to have two or more phases.

FIG. 4 illustrates the connections between the respective coil sets 60 and the control devices 400, where a respective coil set 60 is connected to a respective three phase inverter 410 included on a control device 400 for controlling current flow within the respective coil sets. Each of the respective three phase inverters contain six switches configured in a three phase arrangement having three high side switches and three low side switches, as described below, where a three phase alternating voltage may be generated by the controlled operation of the six switches. However, the number of switches will depend upon the number of voltage phases to be applied to the respective sub motors, where the sub motors can be constructed to have any number of phases.

Figure 5:
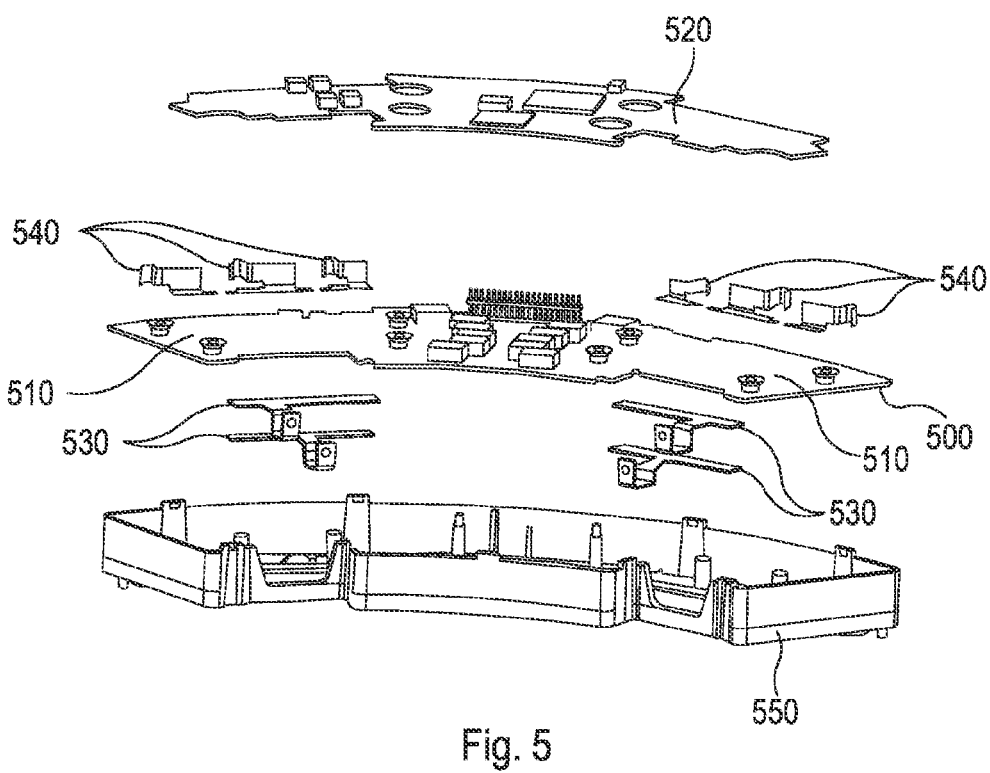
FIG. 5 illustrates an exploded view of a control device according to an embodiment of the present invention.

Preferably, the control devices 400 are of a modular construction. FIG. 5 illustrates an exploded view of a preferred embodiment, where each control device 400, otherwise known as a power module, includes a power printed circuit board 500 in which are mounted two power substrate assemblies 510, a control printed circuit board 520, four power source busbars 530 for connecting to a DC battery, and six phase winding busbars 540 for connecting to respective coil windings. Each of the control device components are mounted within a control device housing 550 with the four power source busbars 530 being mounted on an opposite side of the control device housing 550 to the phase winding busbars 540.

Each power substrate 510 is arranged to be mounted in a respective aperture formed in the power printed circuit board 500.

The power printed circuit board 500 includes a variety of components that include drivers for the inverter switches formed on the power substrate assemblies 510, where the drivers are typically used to convert control signals into a suitable form to turn the inverter switches on and off.

The control printed circuit board 520 includes a processor for controlling the operation of the inverter switches. Additionally, each control printed circuit board 520 includes an interface arrangement to allow communication between the respective control devices 400 via a communication bus with one control device 400 being arranged to communicate with a vehicle controller mounted external to the electric motor. The processor 420 on each control device 400 is arranged to handle communication over the interface arrangement.

As stated above, the processors 420 on the respective control devices 400 are arranged to control the operation of the inverter switches mounted on the respective power substrates 520 within the control housing 550, thereby allowing each of the electric motor coil sets 60 to be supplied with a three phase voltage supply resulting in the respective coil sub-sets generating a rotating magnetic field. As stated above, although the present embodiment describes each coil set 60 as having three coil sub-sets the present invention is not limited by this and it would be appreciated that each coil set 60 may have one or more coils sub-sets.

Under the control of the respective processors 420, each three phase bridge inverter 410 is arranged to provide pulse width modulation PWM voltage control across the respective coil sub-sets, thereby generating a current flow in the respective coil sub-sets for providing a required torque by the respective sub-motors.

PWM control works by using the motor inductance to average out an applied pulse voltage to drive the required current into the motor coils. Using PWM control an applied voltage is switched across the motor windings. During the period when voltage is switched across the motor coils, the current rises in the motor coils at a rate dictated by their inductance and the applied voltage. The PWM voltage control is switched off before the current has increased beyond a required value, thereby allowing precise control of the current to be achieved.

For a given coil set 60 the three phase bridge inverter 410 switches are arranged to apply a single voltage phase across each of the coil sub-sets.

Using PWM switching, the plurality of switches are arranged to apply an alternating voltage across the respective coil sub-sets. The voltage envelope and phase angle of the electrical signals is determined by the modulating voltage pulses.

Figure 1:
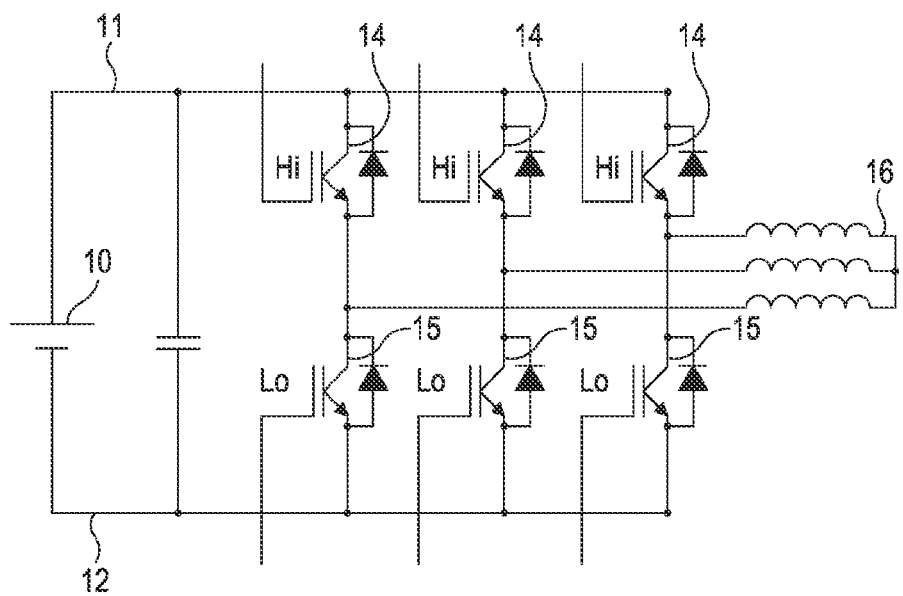
FIG. 1 illustrates a prior art electric motor system.
Figure 6:
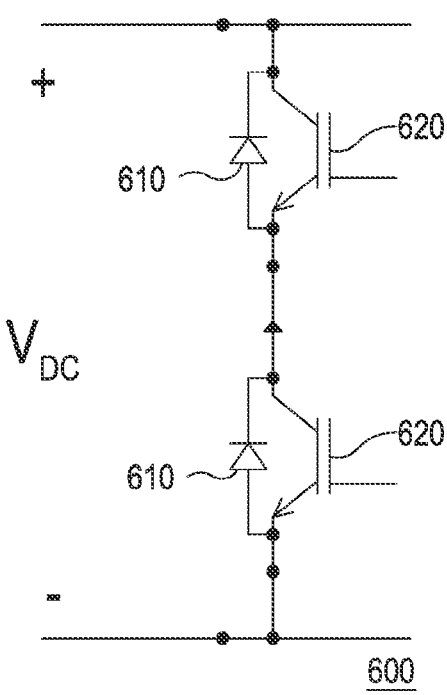
FIG. 6 illustrates a prior art inverter.

The inverter switches can include semiconductor devices such as MOSFETs or IGBTs. In the present example, the switches comprise IGBTs. However, any suitable known switching circuit can be employed for controlling the current. For a three phase inverter having six switches configured to drive a three phase electric motor, the six switches are configured as three parallel sets of two switches, as illustrated in FIG. 1, where each pair of switches is placed in series and form a leg 600 of the three phase bridge circuit to form a three phase bridge inverter configuration. A fly-back diode 610, otherwise known as a reverse diode, is coupled in anti-parallel across each switch 620, as illustrated in FIG. 6. A single phase inverter will have two pairs of switches 620 arranged in series to form two legs 600 of an inverter.

As stated above, each of the inverter legs 600 are electrically coupled between a pair of power source busbars.

As stated above, PWM switching is used to apply an alternating voltage to the electric motors coil windings, where the rotor speed is dependent upon the amplitude of the voltage applied across the coil windings, where the torque applied to the rotor results form the drive current within the coil windings.

Should a fault occur in the electric motor system that causes the electric motor to become non-operational, for example the power source/battery used for driving the electric motor system becomes disconnected from the electric motor systems high voltage busbar, and there is a fault with the low voltage supply for the electric motor system, the electric motor system includes a circuit for placing the inverter into an active short circuit mode. The circuit utilizes the back EMF generated by the electric motor for placing the inverter into the active short circuit mode, thereby avoiding the need for a separate low voltage power rail for the inverter switches.

Figure 7:
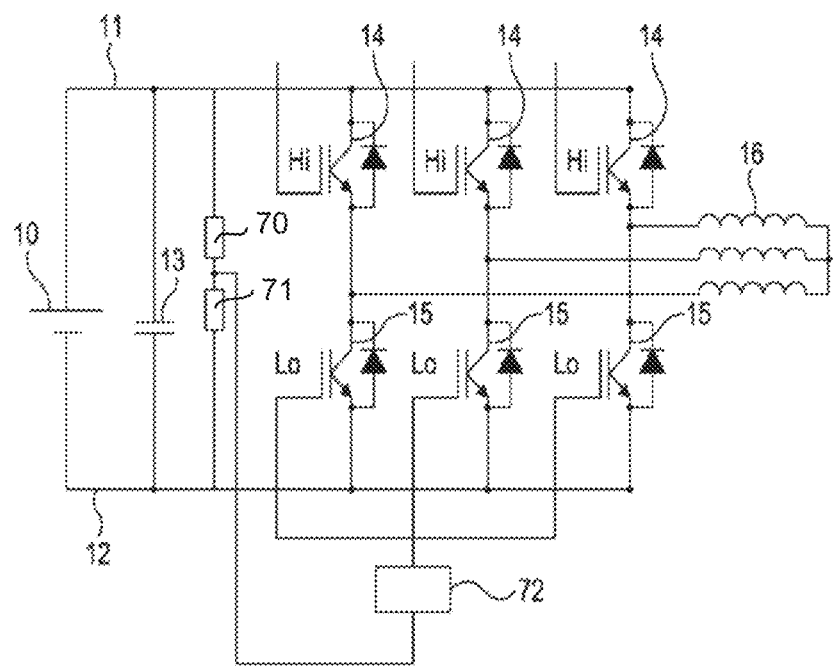
FIG. 7 illustrates an electric motor system according to a first embodiment of the present invention.

A first embodiment of the circuit incorporated into an electric motor system is illustrated in FIG. 7, where the same reference numerals are used to reference the same features as those shown in FIG. 1.

FIG. 7 shows an electric motor system having a battery 12 coupled to a first busbar 11 and a second busbar 12, which in turn are coupled to a DC link capacitor 13 and a three phase inverter having three high side switches 14 and three low side switches 15. As illustrated in FIG. 7, the high side inverter switches 14 are coupled to the first busbar 11 (i.e. the positive busbar), while the low side inverter switches 15 are coupled to the second busbar 12 (i.e. the negative busbar). Each high side and low side switch combination form a leg of the inverter, with each leg of the inverter being coupled to a coil winding of a three phase electric motor.

Additionally, a circuit comprising a first impedance 70 and a second impedance 71 are coupled in series between the first power source busbar 11 and the second power source busbar 12. The first impedance 70 is selected to such that a large percentage of the voltage drop across the first power source busbar 11 and the second power source busbar 12 is formed across the first impedance 70, for example 400V. The second impedance 71 is selected to allow low voltage to be formed across the second impedance 71 such that the voltage at a point between the first impedance 70 and the second impedance 71 is a low voltage, for example 12V or 24V, which is suitable for controlling the operation of the low side inverter switches 15. As shown in FIG. 7, this voltage point is connected to the plurality of the low side switches 15, where a controller 72 is preferably utilized to couple the voltage to the plurality of low side inverter switches 15 upon the occurrence of a first predetermined condition, for example a fault in the electric motor and/or associated control system that causes the electric motor to become non-operational. The voltage applied to the low side inverter switch causes the low side inverter switches 15 to close. Similarly, the high side inverter switches 14 are placed in an open configuration, where this may be achieved by any suitable means, for example as a result of no voltage being applied to the respective switches when enhancement mode MOSFET's are used.

As a result of the plurality of low side inverter switches 15 being placed in a close circuit and the high side inverter switches 14 being placed in an open configuration the coil windings of an electric motor are placed in a short circuit configuration. Although the present embodiment describes the short circuit configuration as having the low side inverter switches 15 closed and the high side inverter switches 14 open, equally this configuration may be reversed where the voltage from the back EMF is used to keep the low side inverter switches 15 open and, if necessary, the high side inverter switches closed.

For example, if a fault in the electric motor and/or associated control system is identified as being a result of one of the low side inverter switches staying open, then the back EMF will be used to keep the high side switches closed, as described above, with the remaining low side inverter switches being kept open. Equally, if this scenario were to be reversed, the low side inverter switches would be closed and the remaining operation high side switches would be allowed to go open.

Figure 8:
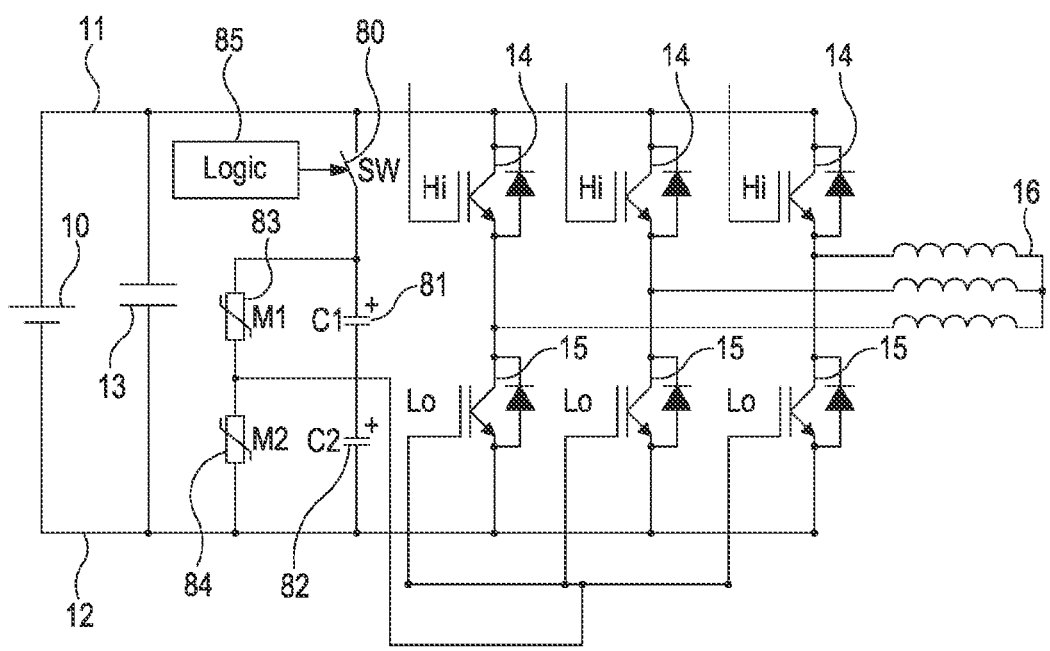
FIG. 8 illustrates an electric motor system according to a second embodiment of the present invention.

A second embodiment of the circuit incorporated into an electric motor system is illustrated in FIG. 8, where the same reference numerals are used to reference the same features as those shown in FIG. 1. This circuit provides greater control over the circuit illustrated in FIG. 7, for example this circuit provides greater control on the timing as to when the low side inverter switches are closed for placing the coil windings of the electric motor in a short circuit configuration, while avoiding the need for a separate low voltage power rail for the inverter switches.

FIG. 8 shows a electric motor system having a battery 10 coupled to a first busbar 11 and a second busbar 12, which in turn are coupled to a DC link capacitor 13 and a three phase inverter having three high side switches 14 and three low side switches 15. As illustrated in FIG. 8, the high side inverter switches 14 are coupled to the first busbar 11 (i.e. the positive busbar), while the low side inverter 15 switches are coupled to the second busbar 12 (i.e. the negative busbar). Each high side and low side switch combination form a leg of the inverter, with each leg of the inverter being coupled to a coil winding of a three phase electric motor.

Additionally, a circuit comprising a first switch 80, a first capacitor 81 and a second capacitor 82 are coupled in series between the first power source busbar 11 and the second power source busbar 12, where the low side inverter switches 15 are coupled to a point between the first capacitor 81 and the second capacitor 82.

Preferably, a first voltage clamp device 83 is coupled across the first capacitor 81 and a second voltage clamp device 84 is coupled across the second capacitor 82, as described below.

As shown in FIG. 8, the voltage point between the first capacitor and the second capacitor is coupled to the plurality of low side switches.

In a preferred embodiment, the first capacitor 81 is a high voltage capacitor, the second capacitor 82 is a low voltage capacitor, the first switch 80 is a depletion mode semiconductor switch, the first voltage clamp device 83 is a high voltage clamp device, for example a metal oxide varistor, resistor or Zener diode, for voltage clamping, and the second voltage clamp device 84 is a low voltage clamp device, for example a metal oxide varistor, resistor or Zener diode, for voltage clamping.

During normal operation of the electric motor, the first switch 80 receives a control signal, for example via a controller or logic device 85, which keeps the switch open, thereby electrically isolating the first capacitor 81 and the second capacitor 82 from the voltage across the first power source busbar 11 and the second power source busbar 12. Consequently, the circuit does not introduce any power loss during the normal operation of the electric motor.

Upon the occurrence of a predetermined condition associated with a fault within the electric motor system, the first switch 80 is closed resulting in the first capacitor 81 and the second capacitor 82 being charged by the DC link capacitor via the first busbar 11 and the second busbar 12. If the fault within the electric motor system results in a loss of low voltage, by using a depletion mode for semiconductor the loss of low voltage will automatically result in the first switch closing.

Upon the first switch 80 being closed, the ratio of the steady state voltages across the first capacitor 81 and the second capacitor 82 will be dependent upon their respective impedance, and the clamping devices used, where the respective values are chosen so that the majority of the voltage drop is formed across the first capacitor 81. As a consequence of the first capacitor 81 being a high voltage capacitor, the voltage at the point between the first capacitor 81 and the second capacitor 82 is a low voltage, for example 12V or 24V. However the circuit component values may be chosen to provide any suitable voltage value to the low side inverter switches.

The low voltage is provided to the low side inverter switches 15 causing them to close. Similarly, the high side inverter switches 14 are placed in an open configuration, where this may be achieved by any suitable means, for example as a result of no voltage being applied to the respective switches when enhancement mode MOSFET's are used.

As a consequence, upon the occurrence of the predetermined condition, the low side inverter switches 15 are closed and the high side inverter switches 14 are opened resulting in the electric motor coil windings being placed in a short circuit configuration.

In a preferred embodiment, an additional passive device (not shown) may be used to condition the voltage provided to the low side inverter switches for improved operation of the low side inverter switches.

Although the present embodiment describes the short circuit configuration as having the low side inverter switches 15 closed and the high side inverter switches 14 open, equally this configuration may be reversed where the voltage from the back EMF is used to keep the low side inverter switches 15 open and, if necessary, the high side inverter switches closed.

For example, if a fault in the electric motor and/or associated control system is identified as being a result of one of the low side inverter switches staying open, then the back EMF will be used to keep the high side switches closed, as described above, with the remaining low side inverter switches being kept open. Equally, if this scenario were to be reversed, the low side inverter switches would be closed and the remaining operation high side switches would be allowed to go open.

Figure 9A:
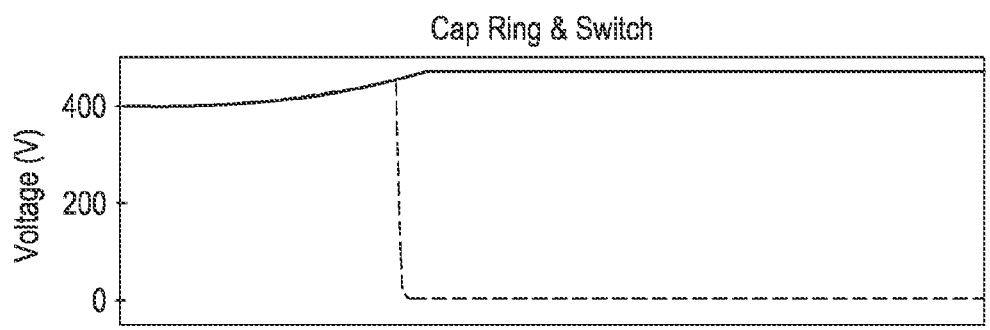
FIG. 9 illustrates electrical characteristics associated with an embodiment of the present invention.
Figure 9B:
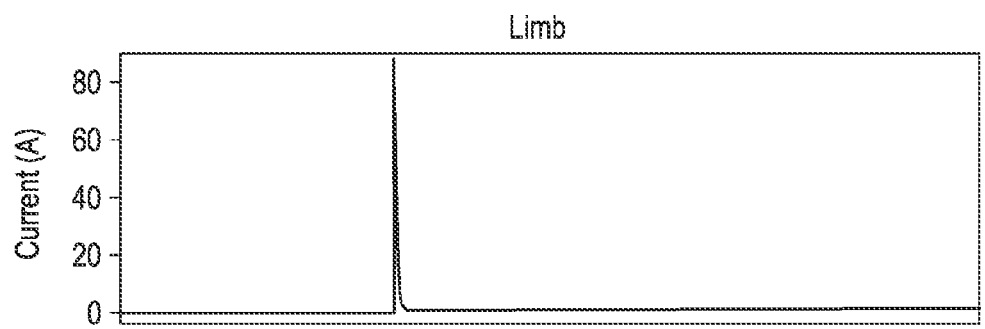
Figure 9C:
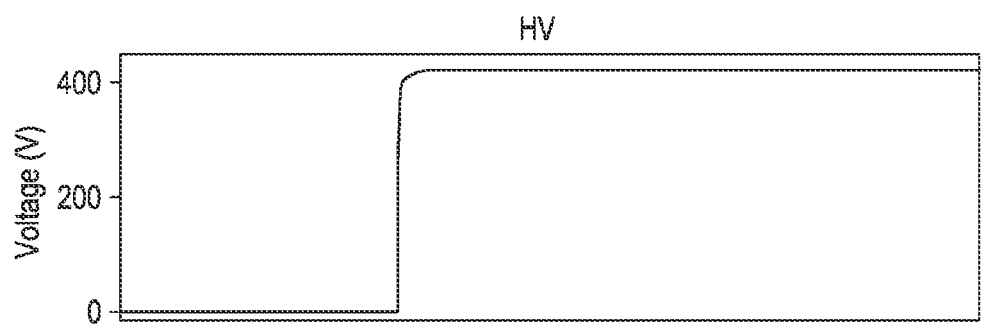
Figure 9D:
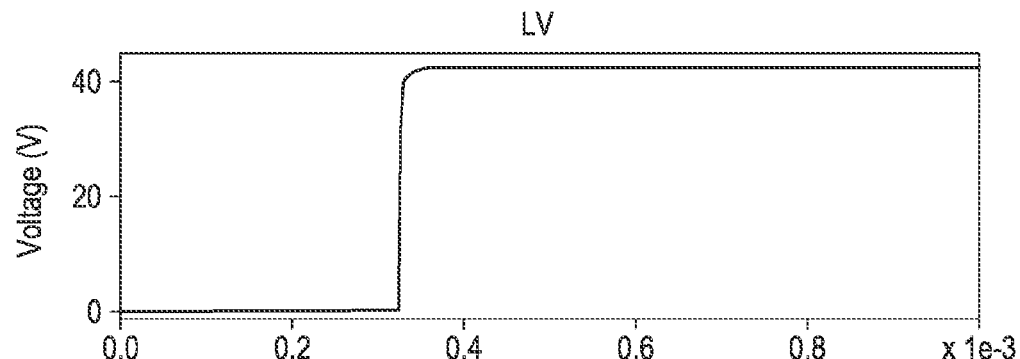

FIGS. 9(a), 9(b), 9(c), and 9(d) illustrate, the change in voltage/current following a fault condition within the electric motor system that results in the back EMF from the electric motor forming across the DC link capacitor, where FIG. 9(a) illustrates the change in voltage in the DC link capacitor 13, FIG. 9(b) illustrates the change in charge current across the first capacitor 81 and the second capacitor 82, FIG. 9(c) illustrates the change in voltage across the first capacitor 81, FIG. 9(d) illustrates the change in voltage across the second capacitor 82.

With respect to FIG. 9(a), at zero seconds, as a result of a fault within the electric motor system, the voltage across the DC link capacitor 13 starts to rise as a result of the back EMF from the electric motor. Once the DC link capacitor voltage exceeds a predefined value, which within the present embodiment is 450V, the first switch is closed resulting in a current pulse charging the first capacitor 81 and second capacitor 82. The charge time and current amplitude will be determined by the lumped inductance and lumped resistance of the circuit.

As illustrated in FIGS. 9(c) and 9(d), the first capacitor 81 is charged to approximately 400V, while the second capacitor 82 is charged to approximately 40V with a small voltage drop across the switch 80, where in a preferred embodiment the energy stored on the second capacitor 82 is used to drive a linear regulator, or similar switching mode power supply, to produce a 15V turn on voltage for the low side inverter switches 15, thereby ensuring that the electric motor is placed in a short circuit configuration even if a low voltage power rail fails, thereby protecting the inverter from an over voltage condition.

Although the above embodiment describes the predetermined condition for placing the electric motor in a short circuit configuration being a result of the DC link capacitor voltage exceeding a threshold value, any predetermined condition associated with a fault with the electric motor system may be used. For example, a fault identified with a low power rail used for controlling the operation of the inverter, a fault with one or more of the inverter switches, or identification that the battery 10 becoming disconnected from the first power source busbar 11 and/or second power source busbar 12.

The invention claimed is:

1. A circuit for a multi phase bridge inverter having a plurality of high side switches arranged to be coupled to a first power source busbar and a plurality of low side switches arranged to be coupled to a second power source busbar, wherein the multi phase inverter is arranged to control current flow in coil windings of an electric motor, and wherein a DC link capacitor is coupled between the first power source busbar and the second power source busbar, the circuit comprising:
a first impedance and a second impedance coupled in series between the first power source busbar and the second power source busbar and in parallel to the DC link capacitor and configured for providing a voltage from the coupling between the first impedance and the second impedance to the plurality of low side switches upon the occurrence of a first predetermined condition to place the plurality of low side switches in a close circuit configuration to allow coil windings of the electric motor to be placed in a short circuit configuration or to the plurality of high side switches upon the occurrence of a first predetermined condition to place the plurality of high side switches in a close circuit configuration to allow coil windings of the electric motor to be placed in a short circuit configuration; and
a controller and a first switch, wherein the switch is coupled between the first power source busbar and the first impedance and the controller is arranged to close the switch upon a second predetermined condition;
wherein the second predetermined condition is a voltage difference between the first power source busbar and second power source busbar increases above a predetermined value.

2. The circuit according to claim 1, wherein the first impedance is created by a first capacitor and the second impedance is created by a second capacitor.

3. The circuit according to claim 2, wherein the first capacitor is a high voltage capacitor and the second capacitor is a low voltage capacitor.

4. The circuit according to claim 1, wherein the first predetermined condition is the closing of the first switch.

5. The circuit according to claim 1, wherein the first predetermined condition is the voltage difference between the first power source busbar and second power source busbar dropping of a voltage from a low voltage power rail falling below a predetermined value.

6. The circuit according to claim 1, further comprising a high voltage clamp coupled in parallel with a first capacitor for clamping the voltage across the first capacitor to a predetermined value and a low voltage clamp coupled in parallel to a second capacitor for clamping the voltage across the second capacitor to a predetermined value.

7. The circuit according to claim 1, wherein the first switch is a depletion mode semiconductor switch.

8. The circuit according to claim 1, further comprising a logic device to determine if one of the low side inverter switches remains open, wherein upon determining if one of the low side inverter switches remains open, the plurality of high side switches are placed in a close circuit configuration to allow coil windings of an electric motor to be placed in a short circuit configuration.

9. The circuit according to claim 1, further comprising a logic device to determine if one of the high side inverter switches remains open, wherein upon determining if one of the high side inverter switches remains open, the plurality of low side switches are placed in a close circuit configuration to allow coil windings of an electric motor to be placed in a short circuit configuration.

10. The circuit according to claim 1, further comprising a high voltage clamp coupled in parallel with a first capacitor for clamping the voltage across the first capacitor to a predetermined value and a low voltage clamp coupled in parallel to a second capacitor for clamping the voltage across the second capacitor to a predetermined value.

11. A circuit for a multi phase bridge inverter having a plurality of high side switches arranged to be coupled to a first power source busbar and a plurality of low side switches arranged to be coupled to a second power source busbar, wherein the multi phase inverter is arranged to control current flow in coil windings of an electric motor, and wherein a DC link capacitor is coupled between the first power source busbar and the second power source busbar, the circuit comprising:
- a first impedance and a second impedance coupled in series between the first power source busbar and the second power source busbar and in parallel to the DC link capacitor and configured for providing a voltage from the coupling between the first impedance and the second impedance to the plurality of low side switches upon the occurrence of a first predetermined condition to place the plurality of low side switches in a close circuit configuration to allow coil windings of the electric motor to be placed in a short circuit configuration or to the plurality of high side switches upon the occurrence of a first predetermined condition to place the plurality of high side switches in a close circuit configuration to allow coil windings of the electric motor to be placed in a short circuit configuration; and
- a controller and a first switch, wherein the switch is coupled between the first power source busbar and the first impedance and the controller is arranged to close the switch upon a second predetermined condition;
wherein the second predetermined condition is the dropping of a voltage from a low voltage power rail falling below a predetermined value.

12. The circuit according to claim 11, wherein the first impedance is created by a first capacitor and the second impedance is created by a second capacitor.

13. The circuit according to claim 12, wherein the first capacitor is a high voltage capacitor and the second capacitor is a low voltage capacitor.

14. The circuit according to claim 11, wherein the first predetermined condition is the closing of the first switch.

15. The circuit according to claim 11, wherein the second predetermined condition is a voltage difference between the first power source busbar and second power source busbar increases above a predetermined value.

16. The circuit according to claim 11, wherein the first predetermined condition is a voltage difference between the first power source busbar and second power source busbar increasing above a predetermined value or the dropping of a voltage from a low voltage power rail falling below a predetermined value.

17. The circuit according to claim 11, wherein the first switch is a depletion mode semiconductor switch.

18. The circuit according to claim 11, further comprising a logic device configured to determine if one of the low side inverter switches remains open, wherein upon determining if one of the low side inverter switches remains open, the plurality of high side switches are placed in a close circuit configuration to allow coil windings of an electric motor to be placed in a short circuit configuration.

19. The circuit according to claim 11, further comprising a logic device configured to determine if one of the high side inverter switches remains open, wherein upon determining if one of the high side inverter switches remains open, the plurality of low side switches are placed in a close circuit configuration to allow coil windings of an electric motor to be placed in a short circuit configuration.

\* \* \* \* \*